Dec. 8, 1959 A. LESNEWICH 2,916,601
ELECTRIC ARC WELDING
Filed Feb. 28, 1958
FIG. 1
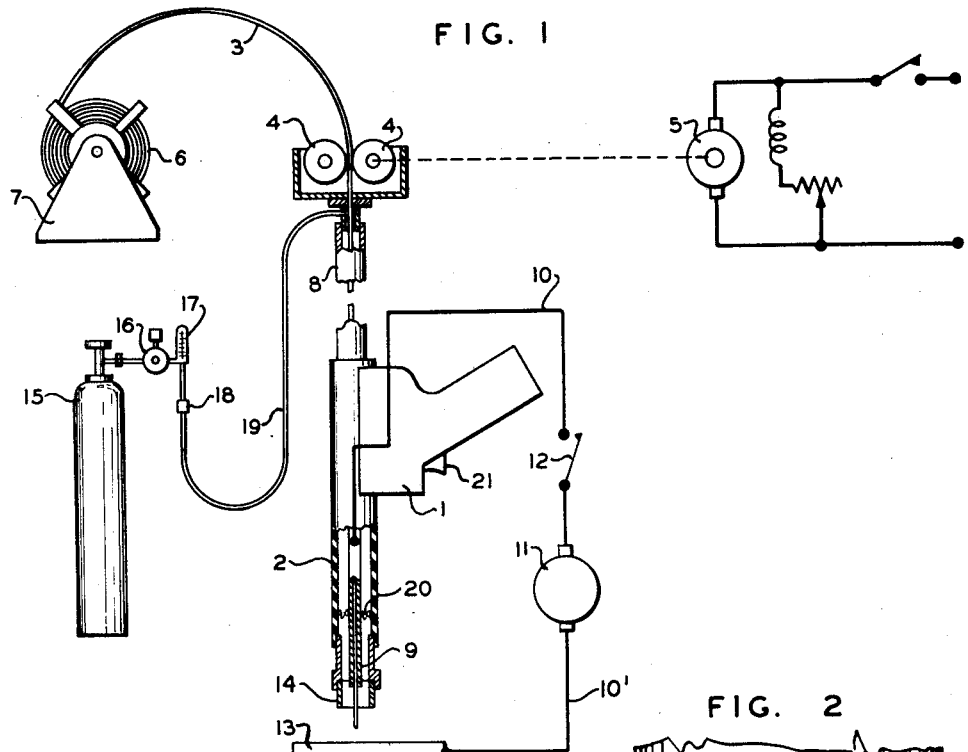
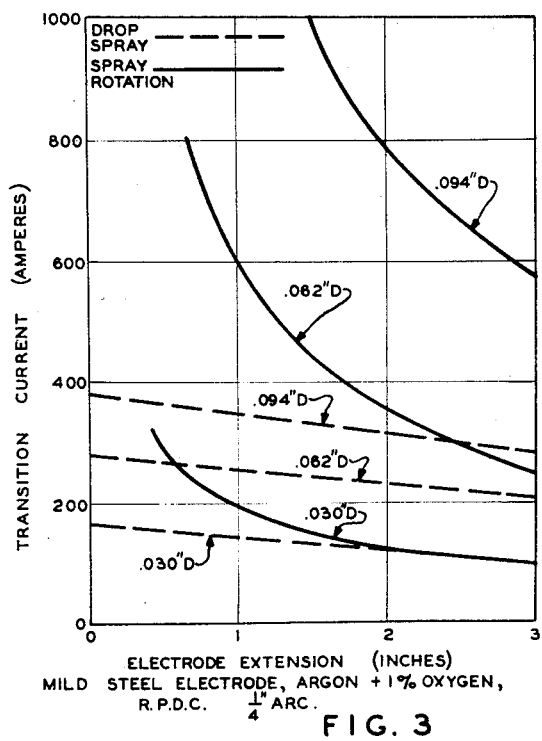
FIG. 3
ELECTRODE EXTENSION (INCHES)
MILD STEEL ELECTRODE, ARGON +1% OXYGEN,
R.P.D.C. ¼" ARC.
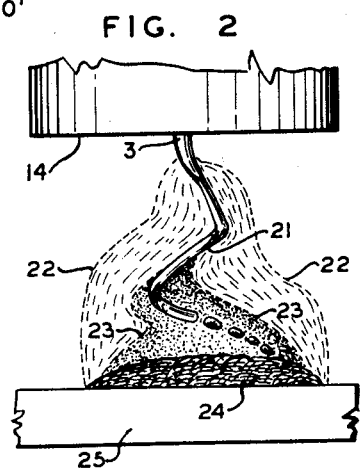
FIG. 2
INVENTOR.
ALEXANDER LESNEWICH
BY H. Hume Matthews
Leslie B. Byer
ATTORNEYS United States Patent Office 2,916,601
Patented Dec. 8, 1959

2,916,601

ELECTRIC ARC WELDING

Alexander Lesnewich, New Providence, N.J., assignor to Air Reduction Company, Incorporated, New York, N.Y., a corporation of New York Application February 28, 1958, Serial No. 718,369

8 Claims. (Cl. 219—74)

My invention relates to electric arc welding characterized by a spray transfer of metal from a consumable electrode to a workpart by a high current density self-regulating arc established in a substantially inert atmosphere between said electrode and the workpart and more particularly to methods of electric arc welding in which the molten metal of the electrode is transferred to the workpart as a rotating spray.

By imparting rotation to a spray of arc deposited metal in accordance with my invention, it is possible to control the width of the deposit and its penetration and to direct the molten electrode metal against the joint walls of deep welding grooves. Also cladding or like operations may be performed at reasonably low currents so that dilution of the deposit by the base metal is minimized.

It is consequently within the objects of my invention to provide methods of arc welding in which the molten metal of a consumable electrode is deposited as a rotating spray upon workparts for the attainment of the above and like purposes.

Further objects of my invention will become apparent from the following description thereof.

Axial-spray transfer of electrode metal in an inert atmosphere by a high current density arc is disclosed and claimed in United States Letters Patent 2,504,868, Albert Muller, Glenn J. Gibson, and Nelson E. Anderson, granted April 18, 1950, for "Electric Arc Welding." As pointed out therein, this axial-spray transfer of molten metal is substantially spatter free, develops deep penetration and is associated with an arc having self-regulating characteristics. The spray transfer is characterized by a pointed electrode tip from which minute drops of metal are transferred axially at a very high rate. Around the electrode tip and each drop is a region of incandescent metal vapor. Because of the large number of drops in motion and the restrictive arc forces, this metal vapor forms a uniform continuum between the electrode and the work that may be described as a vapor jet. This jet, the electrode tip, and the arc crater are, in turn, enveloped by an umbrella or mantle of excited atoms of inert gas and metal vapor.

Such arcs occur in substantially inert gas shields when bare electrodes are used only when operating with direct current at reverse polarity. However, as described and claimed in United States Letters Patent 2,694,763 and 2,694,764 both to Albert Muller and both granted November 16, 1954, for "Electric Arc Welding" suitable activation of the electrode surface of a metallic electrode makes it possible to obtain the same spray transfer with straight-polarity direct current arcs and with alternating current arcs.

Low-current reverse-polarity welding arcs in inert gas shields are characterized by a globular transfer of metal from the electrode to the work. A gradual increase in the welding current causes an increase in the electrode melting rate and, at the same time, produces an increase in the rate of drop detachment from the electrode as well as a reduction in the drop size. This gradual change of drop size and frequency of transfer does not continue indefinitely. At a critical level of welding current, referred to as the transition current, the drop size is reduced very suddenly and the frequency of drop transfer increases considerably producing an axial-spray transfer of the fused electrode metal. At the same time, a sharp tip is formed on the electrode.

Most applications of inert-gas metal-arc welding make use of this axial-spray transfer of fused electrode metal. Such arcs are considered more stable than those below the transition current. They produce substantially no weld spatter and the metal is transferred in line with the electrode even when the electrode is at a slight angle with respect to the work. This arc stiffness is achieved as a result of interacting magnetic fields and the small size of the drops, and is highly advantageous since the drops can be easily directed into horizontal fillet welds or into overhead groove welds without affecting the arc behavior. In addition, the concentration of energy in the central region of the arc and the kinetic energy of the metal drops striking the weld pool produce deep weld penetration.

The magnitude of the transition current which is productive of this unique axial-spray transfer of metal from the electrode can be varied somewhat since it is affected by a number of variables, the most important of which are the electrode composition and diameter, the extension of the electrode from its current contact, the type and degree of electrode activation, and the electrode polarity.

I have discovered that if the magnitude of current, and the electrode feed rate, are continually increased beyond the above referred to transition current while holding the arc length and the electrode extension fixed, a second level of current will be reached beyond which the arc characteristics again change. Above this second level of current, the tip of the electrode is caused to bend and rotate about the longitudinal axis of the body portion of the electrode. Thereafter continued increase of current will increase the angle of bend at the electrode tip until it is almost at right angles to the axis of the electrode body. In this extreme condition, the molten electrode metal is spewed in all directions as spatter and the arc is no longer useful as a tool for welding. The type of metal transfer above this second level of current will be termed rotating-spray. It develops at some critical value of current and, as with the transition from drop to axial spray, the current at which it occurs is dependent upon the electrode polarity, diameter, extension, composition, and activation.

When this rotating-spray transfer of electrode metal occurs, the arc appears by visual inspection, to be split into two, distinct spray arcs positioned at an angle with one another and with the axis of the body portion of the electrode. Actually the arc is rotating to form a cone whose apex is at the axis of the body portion of the electrode. Ultra-slow motion pictures of these arcs show that the electrode tip and vapor jet are rotating and that molten metal is released from the electrode at an angle to the longitudinal axis of its body portion.

At currents just above that where rotating-spray transfer of metal is initiated, use may be made of the arc to widen somewhat the weld bead and to prevent the formation of the papillary penetration that is characteristic of the axial-spray type of arc. Furthermore, with controlled rotation, the arc may be used for cladding and similar operations. With long extensions of the electrode from its current contact and with small diameter electrodes, overlays of metal at reasonably low currents may be obtained so that dilution of the deposited metal by the base metal is minimized. Rotating arcs are also useful for deep groove welding since the weld metal is better directed at the walls of the groove.

The amount of rotation of the arc and of the molten metal therein may be controlled by controlling the relationship of the diameter of the electrode and its extension from its support means by which arcing current is supplied thereto relative to the magnitude of the arcing current to obtain operating conditions which render the end portion of the electrode extending beyond its support and in the region of the arc both plastic and deformable by the reaction forces of the arc and the release of molten metal and metal vapor from its arcing terminal whereby rotation is imparted to the arc and the molten metal therein. By controlling the angle of bend of the plastic end portion of the electrode, the width of the deposit of molten metal on a workpart may be controlled.

The effects of the electrode extension and diameter are interrelated as shown in the following empirical equation for a typical commercial mild steel electrode arcing at reverse-polarity direct current in a shielding gas of argon containing 1% oxygen:

$$I_R = 25 + 1350D + 14.5 \times 10^4 \frac{D^2}{L}$$

where $I_R$ is the lowest current at which a rotating-spray arc is produced with an electrode having a diameter of D inches and an extension of L inches. The middle term of this equation demonstrates the effect of the diameter of the electrode on its stiffness and the last term of the equation is proportional to the reciprocal of the electrical resistance of the electrode and is therefore equivalent to its conductivity. Rotation of the electrode tip cannot develop until a reasonable length is heated by its own resistance to a highly plastic or liquid state.

The features of my invention which I believe to be novel are set forth in the appended claims. The following more complete description of my invention may best be understood by reference to the accompanying drawing in which:

Fig. 1 shows apparatus that may be used in practicing my invention;

Fig. 2 shows the nature of the rotating arc of my invention as recorded in a frame of a motion picture film taken at about 4,000 frames per second; and Fig. 3 shows a chart giving transition currents for different electrode extensions for mild steel electrodes of three different diameters for ¼ inch arcs operating at reverse polarity, direct current in a shielding atmosphere of argon containing 1% oxygen.

Apparatus that may be used in practicing my method of welding is shown in Fig. 1 of the drawing. It embodies means for feeding a consumable electrode of indefinite length throughout a support by means of which current is supplied thereto near its arcing terminal, and a nozzle structure by which a substantially inert shielding gas is supplied about the arcing terminal of the electrode.

As shown in Fig. 1, this apparatus comprises a hand tool or gun 1 provided with a welding head 2 through which the electrode 3 is fed by feed rolls 4 driven by an adjustable speed motor 5. The electrode 3 is withdrawn from a reel 6 supported in a bracket 7 and is fed by rolls 4 through a flexible conduit 8 of fixed length interconnecting the wire feeding mechanism with the welding head. Arcing current is supplied to the electrode 3 by a contact tube 9 forming part of the welding head 2. This contact tube acts as a support for the arcing end of the electrode and is electrically connected by a conductor 10 with one terminal of a welding generator 11 through a switch 12. The other terminal of this generator is electrically connected with the work 12 by a conductor 10′.

Shielding gas is supplied about the arcing terminal of the electrode through a nozzle structure 14 forming part of the welding head. This gas is supplied from a gas cylinder 15 through a pressure reducing valve 16, a flow meter 17, a control valve 18 and a hose 19 to a conduit 8. The gas flows through conduit 8 in the space between its shell and the electrode 3 which is fed therethrough to the welding head 2. The gas passes through conduit or conduits in the welding head to its nozzle structure 14 from which it is discharged about the arcing terminal of the electrode.

To obtain the best gas shielding effect at the arc, the gas should be discharged about the arcing terminal of the electrode in a manner to insure a substantially non-turbulent envelope of gas at the welding zone. Consequently, the gas conduit or conduits in the welding head and the dimensions of the contact tube 9 and the nozzle 14 are such as to obtain this non-turbulent flow of shielding gas. If desired suitable baffles such as shown at 20 may be provided in the welding head to break up any circumferential flow of gas that might otherwise occur and to insure axial flow of the shielding gas toward and through the orifice enclosing the projecting arcing end portion of the electrode.

A suitable control activated by a switch 21 in the hand grip of gun 1 may be associated with the apparatus above described in order to provide an automatic sequencing of the operations of controlling the feed of the electrode and the supply of welding current and shielding gas to the welding head. One such control has been illustrated and described in Patent 2,504,868 above referred to.

Fig. 2 shows the nature of a rotating-spray arc obtained when practicing my invention. This illustration was made by reproducing the image of one frame of a motion picture film taken at about 4,000 frames per second. It shows the operation of a ¼ inch arc established between a workpart and a mild steel electrode of .045 inch in diameter with 1 inch extension or stick-out from its contact by which 430 amperes was supplied therethrough to the arc which operated at about 43 volts in a substantially inert atmosphere of argon containing 1% oxygen. As shown in Fig. 2 the molten metal 21 transferred in the arc assumes the appearance of a conical helix which is completely enclosed by a mantle 22 which is believed to be excited atoms of inert gas and partly enclosed at its lower portion by an inner mantle 23 which is believed to be, for the most part, metal vapor. The rotating arc in its entirety appears to be a cone having its axis in the longitudinal axis of the body portion of the electrode and its base covering the molten metal 24 on the workpart 25.

When the welding current is increased to and above the level at which a rotating spray of electrode metal is obtained, the tip portion of the electrode becomes plastic and is both deflected by the reaction forces due to the release of metal vapor and molten metal from its tip and also rotated in much the same manner as the nozzle end of a flexible garden hose that is suspended to allow freedom of movement of its nozzle end while it is discharging water from the nozzle. As the current productive of rotating spray is increased, the electrode tip becomes more plastic while at the same time the forces at its tip are stronger so that the degree of deflection is greater and a spattery arc is developed.

The postulate that electrode plasticity is responsible for rotation gains validity from the fact that the same geometric factors that cause the electrode tip to be heated by resistance to a highly plastic or even liquid state also are those that control the level of current at which the rotating phenomenon is initiated. In addition, those variables that control resistivity of the electrode have a proportional effect upon the current at which rotating spray is formed.

One of the variables affecting the current level at which rotation begins is the electrode extension. This current level is directly related to the reciprocal of electrode extension. Less current is needed to initiate rotation with increasing extensions if the diameter and composition of the electrode are not changed. As an example, an .062-inch-diameter mild-steel electrode will develop rotation with currents in excess of 600 amperes for an extension greater than one inch and with currents over 260 amperes for a three-inch extension as shown in Fig. 3 of the drawing. This effect of extension on the transition current is not surprising since less current is needed with long extension to produce the amount of resistance heating that is required to reduce the stiffness of the electrode to the point where the arc forces can initiate rotation.

Large-diameter electrodes are mechanically stiff and have relatively low resistance to the flow of current. Therefore, higher currents are needed to achieve rotation when the electrode diameter is increased while holding its extension fixed. Thus, as shown in Fig. 3 with a fixed extension of two inches, 800 amperes are needed to achieve rotation with a .094-inch-diameter electrode but only 125 amperes are needed with an electrode diameter of .030 inch. This interrelation of extension and diameter of the electrode has been noted above in connection with the empirical equation there given for obtaining the lowest current at which a rotating spray is produced for a mild steel electrode arcing at reverse polarity direct current in argon with 1% oxygen employed as the shielding gas.

The electrode composition will have an effect on the electrode conductance and consequently on the magnitude of welding current required to develop rotation of the electrode tip. The conductance is directly proportional to the conductivity of the electrode and, for this reason, the transition current from axial spray to rotating spray is dependent upon the electrode composition. Aluminum electrodes have a high conductivity, approximately five times that of steel. As a result, when a .062-in.-diameter aluminum electrode having a two-inch extension was evaluated, a rotating-spray transfer was not observed at 800 amperes although a steel electrode of the same dimensions developed rotation spray at 350 amperes, as shown in Fig. 3. More than 1500 amperes would be needed with a .062-inch-diameter aluminum electrode to cause its tip to begin to rotate. Rotation develops with stainless steel, other ferrous alloys and bronzes at current values comparable to those for mild steel.

Rotating-spray arcs have not been found with bare electrodes and straight-polarity direct current supplied to the arc. This is probably due to the relatively large cross-sectional area of the blunt tip, the absence of a vapor jet in the arc, and the presence of relatively massive metal drops. However, activation of the electrode in straight-polarity direct current welding produces a pointed tip, a vapor jet and a reduction in drop size all of which are typical of reverse-polarity arcs. These changes allow the development of rotating-spray transfer with straight-polarity arcs. The current at which it develops is controlled by the degree of activation since this modifies the shape of the electrode tip. Although rotating-spray transfer has not been found when the massive drops typical of untreated electrodes with straight-polarity arcs are present, it can be made to occur at reverse-polarity when small-diameter electrodes and long extensions thereof are used.

As shown in Fig. 3 changes in electrode extension have a much greater effect upon the level of current for transition from axial spray to rotating spray than upon the current for transition from globular to axial spray. Because of this, longer extensions allow the level of current at which rotation of the arc begins to approach that at which spray is initiated. The extension can be made so great that the current for transition from globular to axial spray is exactly the same as that at which rotation begins. It is then impossible to achieve axial-spray transfer without rotation. This condition is more probable with small-diameter electrodes as shown in Fig. 3 where this occurs with a .030-inch-diameter steel electrode when the extension is greater than 2.25 inches.

Fig. 3 also shows that long electrode extensions restrict the range of welding currents producing axial-spray transfer. This is most apparent with small-diameter electrodes. The range of current for a .030-inch-diameter electrode is between 150 amperes where drop transfer occurs, and 300 amperes where rotating spray occurs when its extension is ½ inch. However, using a .062-inch-diameter electrode and ½ inch stick-out, axial-spray transfer is obtained between 260 and 1000 amperes and can be obtained with extensions in excess of three inches. These limitations that are imposed upon the maxima and minima of current also restrict the deposition rates that can be achieved.

In review of the above observations, it is believed to be quite apparent what relationship between electrode diameter and extension relative to the welding current must be employed in order to practice my invention by which a conical rotation is imparted to the arc and the molten metal therein. This molten metal is, for the most part, in the nature of a spray of small drops although at times the molten metal may be discharged from the pointed electrode tip at so high a rate that it does not break up into small drops until it has travelled part way to the workpart.

It is of course apparent that other forms of apparatus than that illustrated in the drawing and described above may be used in practicing my invention. For example, the welding head of such apparatus may be adjustably mounted on a support so that its position relative to the work can be accurately determined in order to preset the amount of electrode extension or stick-out which is to be employed for an electrode of predetermined diameter. Furthermore, in view of the high current values employed for obtaining rotating-spray deposits, it may be necessary to provide suitable cooling features for those parts of the welding apparatus through which the welding current is supplied to the electrode as well as to those parts of the apparatus which are exposed to the arc. Such arrangements are well known in the art and need not be illustrated or described herein.

It is of course in accordance with my invention to perform the welding operation in a substantially inert atmosphere such as argon. A small addition of oxygen to a shielding gas such as argon, as has been referred to above, in no way detracts from the substantially inert characteristics of the shielding atmosphere provided thereby. It is consequently to be understood that the specification of a substantially inert atmosphere as used above is intended to cover the use of a pure inert gas and such gas to which minor additions of other materials or gases have been added without detracting from the substantially inert characteristics thereof.

Modifications and adaptations of my invention will readily occur to those skilled in the art. It is consequently my intention to cover by the appended claims all such changes and modifications of my invention above described which do not constitute departures from the spirit and scope thereof.

I claim:

1. The method of imparting conical rotation to the molten metal supplied from a consumable metal electrode by a high current density self-regulating arc established in a substantially inert atmosphere by feeding said electrode into said arc in accordance with its consumption which comprises correlating the relationship of the diameter and extension of said electrode beyond its support by means of which arcing current is supplied thereto relative to the magnitude of said arcing current to render the arcing end portion of said electrode extending beyond said support both plastic and deformable by the reaction forces of said arc and the release of molten metal and metal vapor from its arcing terminal whereby rotation is imparted to said arc and the molten metal therein, and controlling the angle of bend of said plastic end portion of said electrode and the width and penetration of the deposit of said molten metal on a workpart by controlling said relationship between said electrode diameter and extension and the magnitude of said arcing current supplied to said electrode at values thereof which in combination impart said rotation to said arc and the molten metal therein.

2. The method of imparting conical rotation to the molten metal supplied from a consumable metal electrode by a high current density self-regulating arc established in a substantially inert atmosphere by feeding said electrode into said arc in accordance with its consumption which comprises correlating the diameter and extension of said electrode beyond its support by means of which arcing current is supplied thereto relative to the magnitude of said arcing current to render the arcing end portion of said electrode extending beyond said support both plastic and deformable by the reaction forces of said arc and the release of metal vapor and molten metal from its arcing terminal whereby rotation is imparted to said arc and the molten metal therein, and controlling the angle of bend of said plastic end portion of said electrode and the deposit of said molten metal by controlling the magnitude of said arcing current which is supplied to said electrode at values greater than required to initiate rotation of said arc.

3. In the spray transfer of metal by a high current density self-regulating arc established in a substantially inert atmosphere between a consumable metallic electrode and a workpart, a method of imparting rotation to said arc and the metal spray therein to form a cone whose axis in the longitudinal axis of the body portion of said electrode which comprises correlating the diameter and extension of such electrode to its feed rate and the magnitude of the arcing current supplied thereto to cause the tip portion of said electrode to bend and rotate in response to the reaction forces of said arc and the release of metal vapor and metal droplets from the arcing terminal of said electrode, and controlling the width of the deposit of the spray transferred metal on the workpiece by controlling the magnitude of said arcing current above that level at which said rotation is imparted to the tip portions of said electrode.

4. The method of imparting conical rotation to the molten metal supplied from a consumable metal electrode by a high current density self-regulating arc established in a substantially inert atmosphere by feeding said electrode into said arc in accordance with its consumption, which comprises correlating the relationship of the diameter and extension of said electrode beyond its support by means of which arcing current is supplied thereto relative to the magnitude of said arcing current to obtain on visual inspection what appears to be an arc split into two parts which are at an angle to one another and the axis of the body portion of said electrode, and controlling the angle of split between said two apparent parts of said arc by controlling said relationship between said electrode diameter and extension and the magnitude of said arcing current at values thereof which in combination are productive of said apparent split in said arc to control the width and penetration of the deposit of electrode metal on a workpart.

5. The method of depositing metal on a workpart which comprises establishing a high current density self-regulating arc in a substantially inert atmosphere by feeding said electrode into the arc in accordance with its consumption, correlating the diameter and extension of said electrode beyond its support by which arcing current is supplied thereto relative to the magnitude of said arcing current to render the end portion of said electrode extending beyond said support both plastic and deformable by the reaction forces of said arc and the release of metal vapor and molten metal from its arcing terminal whereby rotation is imparted to said arc and said molten metal therein, and maintaining said arcing current supplied to said arc at a value above that at which said rotation is initiated, but less than that which will produce excessive spatter of the metal being deposited.

6. The method of depositing metal on a workpart which comprises establishing a high current density self-regulating arc in a substantially inert atmosphere by feeding said electrode into the arc in accordance with its consumption, correlating the diameter and extension of said electrode beyond its support by which arcing current is supplied thereto relative to the magnitude of said arcing current to render the end portion of said electrode extending beyond said support both plastic and deformable by reaction forces of said arc and the release of molten metal and metal vapor from its arcing terminal whereby rotation is imparted to said arc and the molten metal therein, and maintaining said arcing current supplied to said electrode at values just above those at which said rotation is initiated.

7. The method of depositing molten metal on a workpart which comprises establishing a high current density self-regulating arc between a consumable metal electrode and the workpart in a substantially inert shielding atmosphere by feeding the electrode into said arc in accordance with its consumption, supplying arcing current to said electrode at a position spaced from its arcing terminal by a distance relative to the diameter of said electrode and the magnitude of said arcing current to produce a spray transfer of metal droplets from said electrode to the work and cause the tip of said electrode to bend and rotate in response to the reaction forces of said arc and the release of metal vapor and metal droplets from the arcing terminal of said electrode, and controlling the width of deposit of the metal spray of said arc on the workpiece by controlling the magnitude of said arcing current at values above that level at which said rotation of said arc is initiated.

8. The method of depositing molten metal on a workpart which comprises establishing an arc between a mild steel electrode and the workpart in a shielding atmosphere of argon containing about 1% oxygen with current supplied from a direct current source with the electrode at positive polarity and feeding said electrode in accordance with its consumption in the arc relative to a contact-making support by which said current is supplied thereto, and controlling the magnitude of said current relative to the diameter and projection of said electrode from its said support so that said current in amperes is equal to or greater than $$25 + 1350D + 14.5 \times 10^4 \frac{D^2}{L}$$

where D is the diameter of said electrode in inches and L is the extension in inches by which said electrode projects from said support.

References Cited in the file of this patent

UNITED STATES PATENTS 2,504,868     Muller et al.            Apr. 18, 1950

UNITED STATES PATENT OFFICE

CERTIFICATE OF CORRECTION

Patent No. 2,916,601 December 8, 1959

Alexander Lesnewich

It is hereby certified that error appears in the printed specification of the above numbered patent requiring correction and that the said Letters Patent should read as corrected below.

Column 7, line 28, after "axis", first occurrence, insert -- is --.

Signed and sealed this 17th day of May 1960.

(SEAL)
Attest:

KARL H. AXLINE
Attesting Officer

ROBERT C. WATSON
Commissioner of Patents